Patented Sept. 12, 1922.

1,428,628

UNITED STATES PATENT OFFICE.

WILLIAM P. M. GRELCK, OF ST. PAUL, MINNESOTA.

PREPARED FLOUR.

No Drawing. Application filed November 24, 1919. Serial No. 340,405.

*To all whom it may concern:*

Be it known that I, WILLIAM P. M. GRELCK, a citizen of the United States, residing at the city of St. Paul, in the county of Ramsey and State of Minnesota, have invented certain new and useful Improvements in Prepared Flours, of which the following is a specification.

My invention relates to what is known as prepared flours, that is, those preparations in which several ingredients are combined to simplify the use thereof and reduce the number of materials necessary to be added by the consumer. It is also possible, and it should be one object of the manufacturer to provide a food product of this class which will furnish nutritive combination beyond the reach or knowledge of the ordinary consumer. For this reason as well as for the attractive results and the convenience of the user it is highly desirable that products of this kind shall be supplied with the solid constituents of milk and also that a certain amount of gluten shall be supplied by the use of a proper flour having this as one of its constituents. A flour thus compounded gives the highest amount of proteids, the same being derived, both from the gluten of the flour and from the casein and albumen of the milk. The cheapest and most desirable form in which milk solids may be provided for the purpose stated is that of curdled sour milk or butter-milk. The form in which I prefer to use it, is that obtained as the result of the process set out and described in my patent on a "Self preserving acid milk product and process for making the same" issued June 19, 1917, Serial No. 1,230,479 and also in the patent issued to me on a "Milk-food product, and method of making the same" issued July 9, 1918, No. 1,272,035. In either of said methods of treating the sour milk or buttermilk practically the same result is obtained as the direct effect thereof, viz., an infinitely great number of finely divided non-adherent particles of casein associated with lactic acid, sugar and milk and milk albumen resulting from evaporating the original butter-milk to about one-fifth of the original bulk with simultaneous agitation. This product provides an ideal means of obtaining the casein and other milk solids in perfectly digestible form and provides lactic acid which is desirable for the flavor which is imparted to the finished product, and which may be made available as a leavening agent if desired as hereinafter set forth.

It is impossible, however, directly to mingle this milk product with flours having non-water-soluble gluten. When condensed butter milk is mingled with flours of this class, stringy lumps or masses of gluten are formed which separate from the starchy elements thereof. But I have discovered that condensed-sour-or butter-milk may be evenly and uniformly mingled with those other flours which, like the flour of barley, rice or Indian corn, do not have a true gluten, as gliadin, the characteristic element thereof, is lacking.

In practicing my invention I mix a certain portion of condensed butter-milk with a considerably greater bulk of flour or flours of the latter class. A complete, uniform and homogeneous mixture should be made in which the constituents of the milk are evenly and thoroughly distributed through the mass. When this is done with the ingredients properly proportioned an additional amount of gluten containing flour is added and the two elements are thoroughly mixed. The resulting product may be packed and will be found to have excellent keeping qualities to which the lactic acid contributes. The lactic acid also has a softening action on the gluten thereby making it more readily miscible when water is added. The product may be used without the necessity of other additions beyond water and a leavening agent such as baking powder, but it will be found to have a wide range of use in combination with other food elements.

Different stages of the process may be carried on or aided by the use of mixing, grinding or sifting machines. I do not limit myself to any special process but such may be used in practicing the same as those skilled in the art may find of advantage.

A satisfactory and working proportion of the ingredients is approximately 16% of flour in which the protein is water soluble, 4 or 5% of an acid milk product of the character of that hereinbefore described and 80% of flour having gluten constituents not soluble in water.

But I do not limit myself to these proportions; the relative quantity of the different flours may be varied almost indefinitely as desired.

In the process of manufacture and, after the condensed sour or butter-milk has been thoroughly incorporated into the mass, a suitable proportion of an alkaline carbonate, sufficient to neutralize the lactic acid may be introduced. As the amount of the lactic acid varies in different batches of condensed butter-milk, the amount of acidity shown in each case should, preferably be determined and the alkali such as bi-carbonate of soda be added in proper proportion. Upon the addition of water a leavening gas will thus be given off, up to which time the flour acts as a "binder" for the leavening constituents. The self-rising properties of the prepared flour may be increased by the addition of other leavening elements such as bi-carbonate of soda and cream of tartar, acid phosphate or the like in proper neutralizing proportions. The carbon dioxid generated upon the addition of water will be added to that generated by the combination of the alkaline compound, introduced for that purpose, with the lactic acid of the condensed milk.

I prefer to combine the leavening agents with that portion of the flour which contains the water insoluble gluten before mixing the same with that portion of mixture in which the condensed milk is incorporated, a more uniformly compounded product can thus be obtained.

I claim:

1. The method of making a prepared flour which consists in combining a moist condensed milk product of acid reaction with relatively dry non-glutenous flour in such proportion as to absorb the excess moisture of the milk and then mixing the product with flour having a constituent of water-insoluble gluten.

2. The method of making a prepared flour which consists in combining moist condensed milk products of acid reaction with relatively dry non-glutenous flour, mixing an alkaline carbonate with flour having a constituent of water-insoluble gluten, and then combining the flours thus mixed.

3. An improved flour comprising a non-glutenous cereal element, a glutenous cereal element, and approximately 4% of an acid milk product resulting from the removal of the milk fats and the major part of the original water of solution.

4. The method of making a prepared flour which consists in combining a condensed acid-milk product with relatively dry non-glutenous flour and introducing a neutralizing quantity of an alkaline carbonate.

5. The method of making a prepared flour which consists in combining a condensed acid-milk product with flour, and introducing an alkaline carbonate in excess of the amount necessary to neutralize the lactic acid together with an additional acid element adapted to combine with such excess with the evolution of leavening gas.

6. An improved flour comprising a milk product containing lactic acid and having the casein content in minute, precipitated discontinuous non-adherent particles, non-glutenous flour to absorb the excess flour of said milk product, and flour having the constituent of water-insoluble gluten.

7. An improved flour comprising a milk product containing lactic acid and having the casein content in minute, precipitated discontinuous non-adherent particles, non-glutenous flour to absorb the excess flour of said milk product, flour having the constituent of water-insoluble gluten and an alkaline carbonate adapted to combine with the lactic acid with said milk product with the evolution of carbon dioxide.

In witness whereof, I have hereto set my hand at St. Paul, in the county of Ramsey and State of Minnesota, this 22nd day of November, 1919.

WILLIAM P. M. GRELCK.